US012602849B2

(12) United States Patent
Kang et al.

(10) Patent No.: US 12,602,849 B2
(45) Date of Patent: Apr. 14, 2026

(54) IMAGE GENERATION USING ONE-DIMENSIONAL INPUTS

(71) Applicant: SAMSUNG ELECTRONICS CO., LTD., Gyeonggi-Do (KR)

(72) Inventors: Hyun Jae Kang, Mountain View, CA (US); Siddarth Ravichandran, Santa Clara, CA (US); Ondrej Texler, San Jose, CA (US); Dimitar Petkov Dinev, Sunnyvale, CA (US); Anthony Sylvain Jean-Yves Liot, San Jose, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 290 days.

(21) Appl. No.: 18/342,726

(22) Filed: Jun. 27, 2023

(65) Prior Publication Data

US 2024/0221254 A1     Jul. 4, 2024

Related U.S. Application Data

(60) Provisional application No. 63/436,211, filed on Dec. 30, 2022.

(51) Int. Cl.
| | |
|---|---|
| *G06T 11/60* | (2006.01) |
| *G06T 13/40* | (2011.01) |
| *G06T 13/80* | (2011.01) |

(52) U.S. Cl.
CPC .............. *G06T 11/60* (2013.01); *G06T 13/40* (2013.01); *G06T 13/80* (2013.01)

(58) Field of Classification Search
CPC ......... G06T 11/60; G06T 13/40; G06T 13/80; G06N 3/02; G06N 3/0455
See application file for complete search history.

(56) References Cited

U.S. PATENT DOCUMENTS

| | | | |
|---|---|---|---|
| 5,907,351 | A | 5/1999 | Chen et al. |
| 6,839,672 | B1 | 1/2005 | Beutnagel et al. |
| 7,260,539 | B2 | 8/2007 | Cosatto et al. |
| 9,613,450 | B2 | 4/2017 | Wang et al. |
| 10,304,439 | B2 | 5/2019 | Okaniwa et al. |

(Continued)

FOREIGN PATENT DOCUMENTS

| | | |
|---|---|---|
| CN | 111292407 A | 6/2020 |
| CN | 113609255 A | 11/2021 |

(Continued)

OTHER PUBLICATIONS

WIPO Appln. No. PCT/KR2023/020861, Written Opinion, Mar. 11, 2024, 4 pg.
WIPO Appln. No. PCT/KR2023/020861, International Search Report, Mar. 11, 2024, 4 pg.
WIPO Appln. No. PCT/KR2023/009802, International Search Report, Oct. 23, 2023, 4 pages.
WIPO Appln. No. PCT/KR2023/009802, Written Opinion, Oct. 23, 2023, 5 pg.

(Continued)

*Primary Examiner* — Antonio A Caschera
(74) *Attorney, Agent, or Firm* — Kevin T. Cuenot

(57) ABSTRACT

Image-to-image translations using 1D inputs includes concatenating multiple 1D vectors forming a concatenated 1D vector. The multiplicity of 1D vectors includes 1D vectors of at least two different modalities. An encoded 1D vector is generated by encoding the concatenated 1D vector. An encoded 2D array of features is generated by reshaping an arrangement of features of the encoded 1D feature vector. An image of a virtual human is generated by decoding the encoded 2D array.

20 Claims, 8 Drawing Sheets

(56) References Cited

U.S. PATENT DOCUMENTS

| | | | |
|---|---|---|---|
| 10,521,946 B1 | 12/2019 | Roche et al. | |
| 11,158,102 B2 | 10/2021 | Liu et al. | |
| 11,195,053 B2 | 12/2021 | Kim et al. | |
| 11,270,487 B1 | 3/2022 | Steptoe | |
| 11,410,570 B1 | 8/2022 | Yang et al. | |
| 11,514,634 B2 | 11/2022 | Liao et al. | |
| 2010/0189342 A1 | 7/2010 | Parr et al. | |
| 2015/0187112 A1 | 7/2015 | Rozen | |
| 2016/0170975 A1 | 6/2016 | Jephcott | |
| 2017/0011279 A1* | 1/2017 | Soldevila | G06V 30/226 |
| 2017/0351935 A1 | 12/2017 | Liu et al. | |
| 2019/0318194 A1 | 10/2019 | Liu et al. | |
| 2020/0167605 A1* | 5/2020 | Kim | G06F 18/2413 |
| 2020/0226724 A1 | 7/2020 | Fang et al. | |
| 2020/0380246 A1 | 12/2020 | Liu et al. | |
| 2021/0090314 A1 | 3/2021 | Hussen Abdelaziz et al. | |
| 2021/0166461 A1 | 6/2021 | Riesen et al. | |
| 2021/0192824 A1 | 6/2021 | Chen et al. | |
| 2021/0327404 A1 | 10/2021 | Savchenkov et al. | |
| 2022/0068010 A1 | 3/2022 | Cambra et al. | |
| 2022/0084273 A1 | 3/2022 | Pan et al. | |
| 2022/0129689 A1 | 4/2022 | Kim et al. | |
| 2022/0172462 A1 | 6/2022 | Wang et al. | |
| 2022/0398794 A1 | 12/2022 | Lee | |
| 2022/0399025 A1 | 12/2022 | Chae et al. | |
| 2023/0042654 A1 | 2/2023 | Zhang | |
| 2024/0013462 A1 | 1/2024 | Seol | |
| 2024/0221260 A1 | 7/2024 | Dinev et al. | |

FOREIGN PATENT DOCUMENTS

| | | |
|---|---|---|
| CN | 115170622 A | 10/2022 |
| WO | 2020226785 A1 | 11/2020 |

OTHER PUBLICATIONS

WIPO Appln. No. PCT/KR2023/017157, International Search Report, Feb. 13, 2024, 4 pg.

WIPO Appln. No. PCT/KR2023/017157, Written Opinion, Feb. 13, 2024, 4 pg.

Teng, W. et al., "Unimodal Face Classification with Multimodal Training," with supplementary document, In 2021 16th IEEE International Conference on Automatic Face and Gesture Recognition (FG 2021) (pp. 1-5). IEEE.

Ravichandran, S. et al., "Synthesizing Photorealistic Virtual Humans Through Cross-modal Disentanglement," arXiv:2209.01320v1, Sep. 3, 2022.10 pg.

Suwajanakorn, S, et al., "Synthesizing Obama: learning lip sync from audio," ACM Transactions on Graphics (ToG), Jul. 20, 2017; vol. 36, No. 4, Art. 95, 13pg.

"Synthesia, #1 AI Video Creation Platform," [online] synthesia.io, [retrieved Jun. 29, 2023], retrieved from the Internet: <https://www.synthesia.io/>, 7 pg.

Fruhstuck et al., "InsetGAN for Full-Body Image Generation," In Proc. Of the IEEE/CVF Conf on Computer Vision and Pattern Recognition, 2022, pp. 7723-7732.

EP Appln. No. 23912522, Extended European Search Report, Oct. 13, 2025, 7 pg.

Sinha, S. et al., "Emotion-Controllable Generalized Talking Face Generation," arXiv preprint No., arXiv:2205.01155v1, May 2, 2022, 10 pg.

Richard, A. et al., "Audio-and gaze-driven facial animation of codec avatars," In Proceedings of the IEEE/CVF Winter Conference on Applications of Computer Vision 2021, pp. 41-50.

* cited by examiner

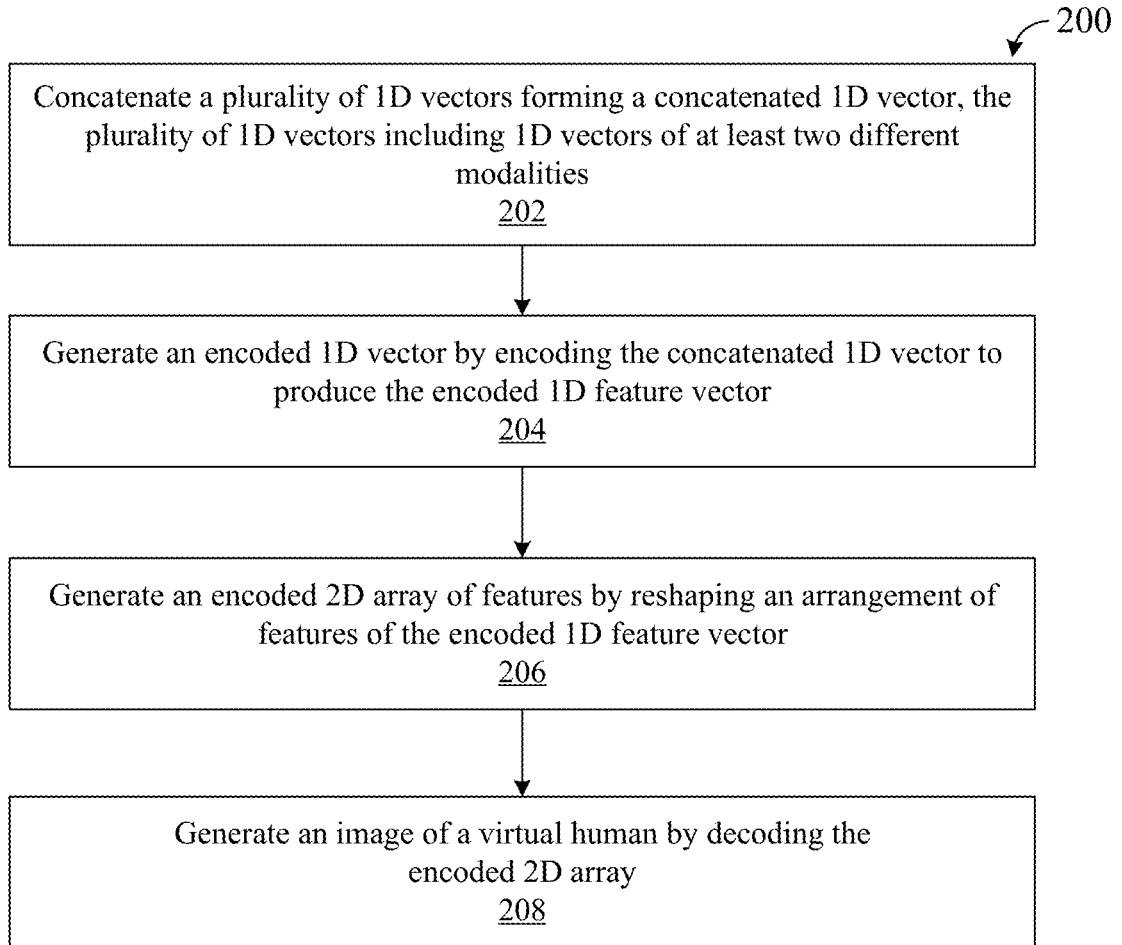

200

Concatenate a plurality of 1D vectors forming a concatenated 1D vector, the plurality of 1D vectors including 1D vectors of at least two different modalities
202

Generate an encoded 1D vector by encoding the concatenated 1D vector to produce the encoded 1D feature vector
204

Generate an encoded 2D array of features by reshaping an arrangement of features of the encoded 1D feature vector
206

Generate an image of a virtual human by decoding the encoded 2D array
208

FIG. 2

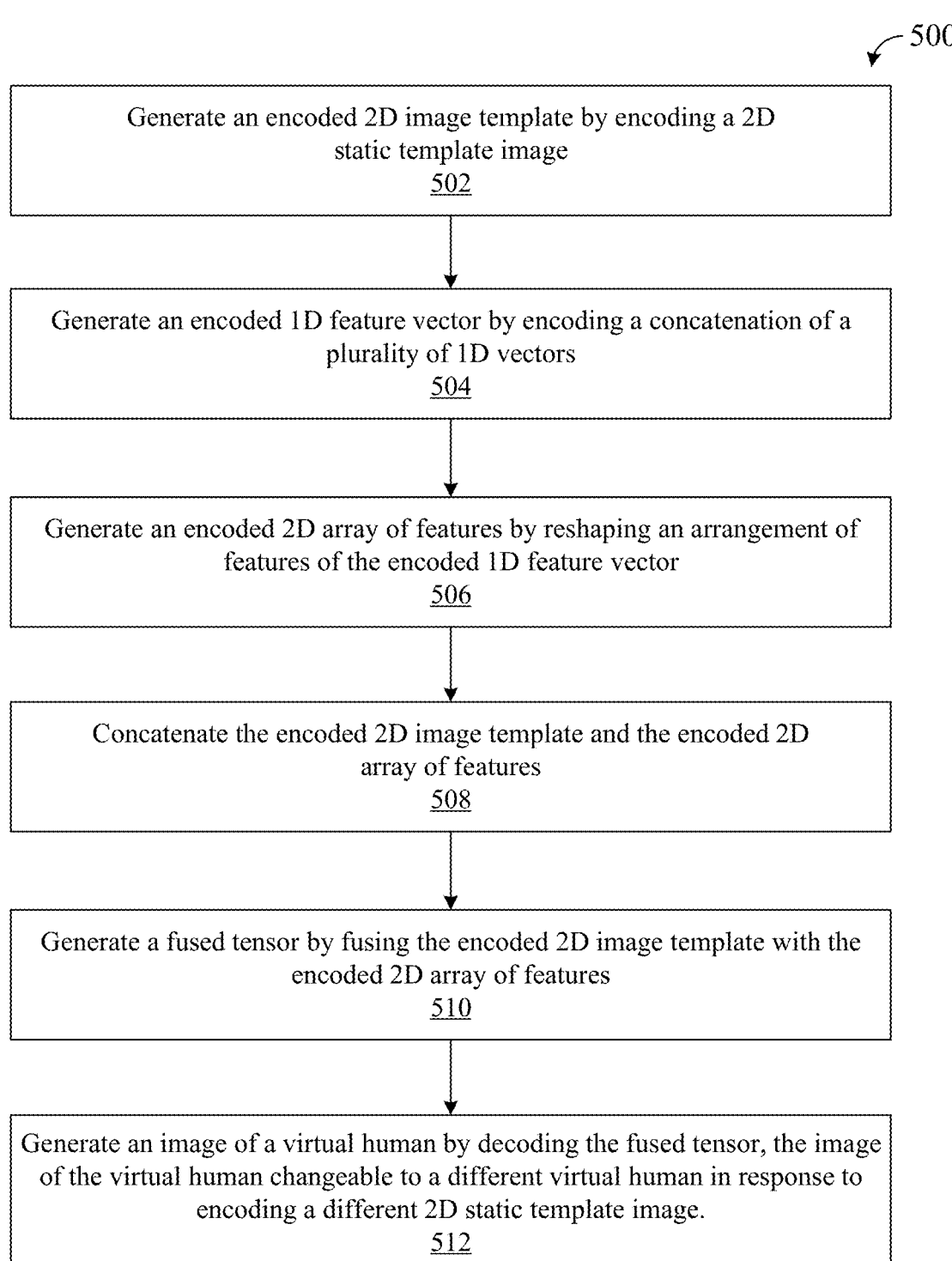

500

Generate an encoded 2D image template by encoding a 2D
static template image
502

Generate an encoded 1D feature vector by encoding a concatenation of a
plurality of 1D vectors
504

Generate an encoded 2D array of features by reshaping an arrangement of
features of the encoded 1D feature vector
506

Concatenate the encoded 2D image template and the encoded 2D
array of features
508

Generate a fused tensor by fusing the encoded 2D image template with the
encoded 2D array of features
510

Generate an image of a virtual human by decoding the fused tensor, the image
of the virtual human changeable to a different virtual human in response to
encoding a different 2D static template image.
512

FIG. 5

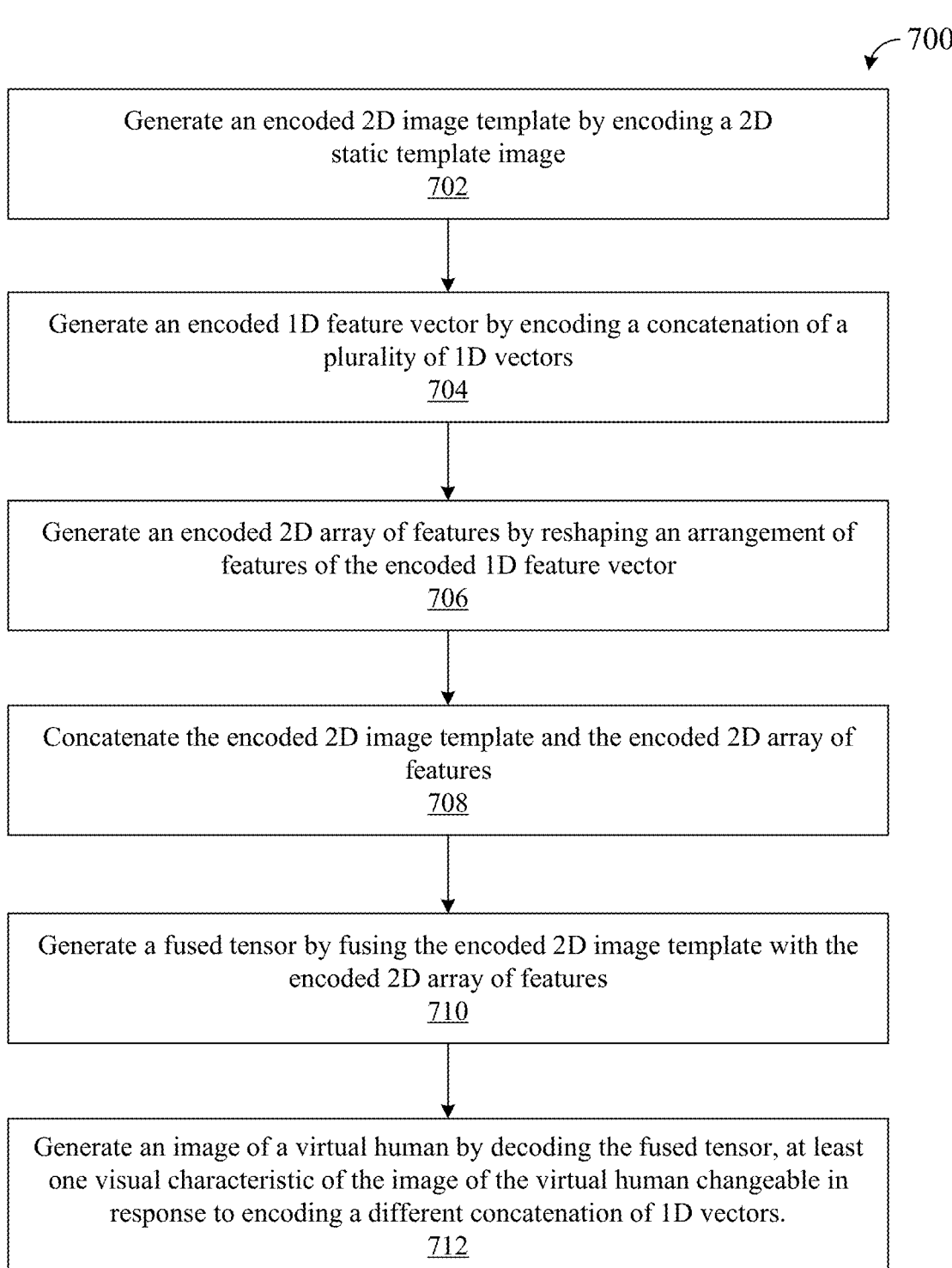

700

Generate an encoded 2D image template by encoding a 2D
static template image
702

Generate an encoded 1D feature vector by encoding a concatenation of a
plurality of 1D vectors
704

Generate an encoded 2D array of features by reshaping an arrangement of
features of the encoded 1D feature vector
706

Concatenate the encoded 2D image template and the encoded 2D array of
features
708

Generate a fused tensor by fusing the encoded 2D image template with the
encoded 2D array of features
710

Generate an image of a virtual human by decoding the fused tensor, at least
one visual characteristic of the image of the virtual human changeable in
response to encoding a different concatenation of 1D vectors.
712

FIG. 7

IMAGE GENERATION USING ONE-DIMENSIONAL INPUTS

CROSS-REFERENCE TO RELATED APPLICATIONS

This application claims the benefit of U.S. Application No. 63/436,211 filed on Dec. 30, 2022, which is incorporated herein by reference in its entirety.

TECHNICAL FIELD

This disclosure relates to creating visual images, and more particularly, to generating images of virtual humans conditioned on various types of inputs.

BACKGROUND

A virtual human is a computer-generated entity that is rendered visually with a strikingly human-like appearance. Virtual humans are becoming increasingly popular owing to various reasons, including recent advances in hardware and other technologies that facilitate rapid virtualization, as well as the adoption across different segments of society of virtual experiences such as the Metaverse.

Nevertheless, creating a virtual human remains a complex task. A virtual human is often created using one or more deep learning neural networks. A generative deep-learning model specifically is often used to generate images of a virtual human. Conventional conditional generative deep-learning models typically require the input of two-dimensional (2D) image data to generate virtual humans. There is, however, a need to provide other types of data as an input to the network in generating, for example, a lifelike facial image of a virtual human.

SUMMARY

In one or more embodiments, a computer-implemented method includes concatenating multiple one-dimensional (1D) vectors to form a concatenated 1D vector. The 1D vectors include 1D vectors of at least two different modalities. The method includes generating an encoded 1D vector by encoding the concatenated 1D vector. The method includes generating an encoded 2D array of features by reshaping an arrangement of features of the encoded 1D feature vector into a 2D spatial arrangement. The method includes generating an image of a virtual human by decoding the encoded 2D array.

In one aspect, a video rendering of the virtual human is generated, the video rendering including the image of the virtual human.

In another aspect, each of the 1D vectors used in generating the image of the virtual human is of a different modality.

In another aspect, the 1D vectors include a 1D vector having a first modality including head pose information.

In another aspect, the 1D vectors include a 1D vector having a second modality including features representing audio data. The features representing audio data may include multiple viseme coefficients.

In another aspect, the 1D vectors include a 1D vector with features comprising blend shape coefficients.

In one or more embodiments, a computer-implemented method includes generating an encoded 2D image template by encoding a 2D static template image. The method includes generating an encoded 1D feature vector by encoding a concatenation of a plurality of 1D vectors. The method includes generating an encoded 2D array of features by reshaping an arrangement of the multiple features of the encoded 1D feature vector. The method includes concatenating the encoded 2D image template and the encoded 2D array of features. The method includes generating a fused tensor by fusing the encoded 2D image template with the encoded 2D array of features. The method includes generating an image of a virtual human by decoding the fused tensor. The image of the virtual human is changeable to a different virtual human in response to encoding a different 2D static template image.

In one aspect, the method includes generating a video rendering of the virtual human, the video rendering including the image of the virtual human.

In another aspect, the method includes changing at least one visual characteristic of the image of the virtual human in response encoding a different concatenation of 1D vectors. Changing at least one visual characteristic may include changing the direction of illumination of the image of the virtual human.

In another aspect, the encoded 2D image template and the encoded 2D array of features are concatenated along a channel dimension.

In another aspect, generating the encoded 1D feature vector includes encoding a concatenation of a plurality of 1D vectors that each comprise multiple features corresponding to different modalities. The 1D vectors may include a 1D vector whose features include head pose information. The 1D vectors may include a 1D vector whose features comprise blend shape coefficients. The 1D vectors may include a 1D vector comprising a plurality of features representing audio data. The features representing audio data may include multiple viseme coefficients.

In one or more embodiments, a computer-implemented method includes generating an encoded 2D image template by encoding a 2D static template image. The method includes generating an encoded 1D feature vector by encoding a concatenation of a plurality of 1D vectors. The method includes generating an encoded 2D array of features by reshaping an arrangement of the multiple features of the encoded 1D feature vector. The method includes concatenating the encoded 2D image template and the encoded 2D array of features. The method includes generating a fused tensor by fusing the encoded 2D image template with the encoded 2D array of features. The method includes generating an image of a virtual human by decoding the fused tensor. At least one visual characteristic of the image of the virtual human is changeable in response to encoding a different concatenation of 1D vectors.

In one aspect, the method includes generating a video rendering of the virtual human, the video rendering including the image of the virtual human.

In another aspect, generating the encoded 1D feature vector includes encoding a concatenation of multiple 1D vectors that each comprise multiple features corresponding to different modalities.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 2 illustrates an example method that may be performed by a system executing the architecture of FIG. 1.

FIG. 5 illustrates an example method that may be performed by a system executing the architecture FIG. 3.

FIG. 7 illustrates another example method that may be performed by a system executing the architecture FIG. 3.

DETAILED DESCRIPTION

Figure 1:
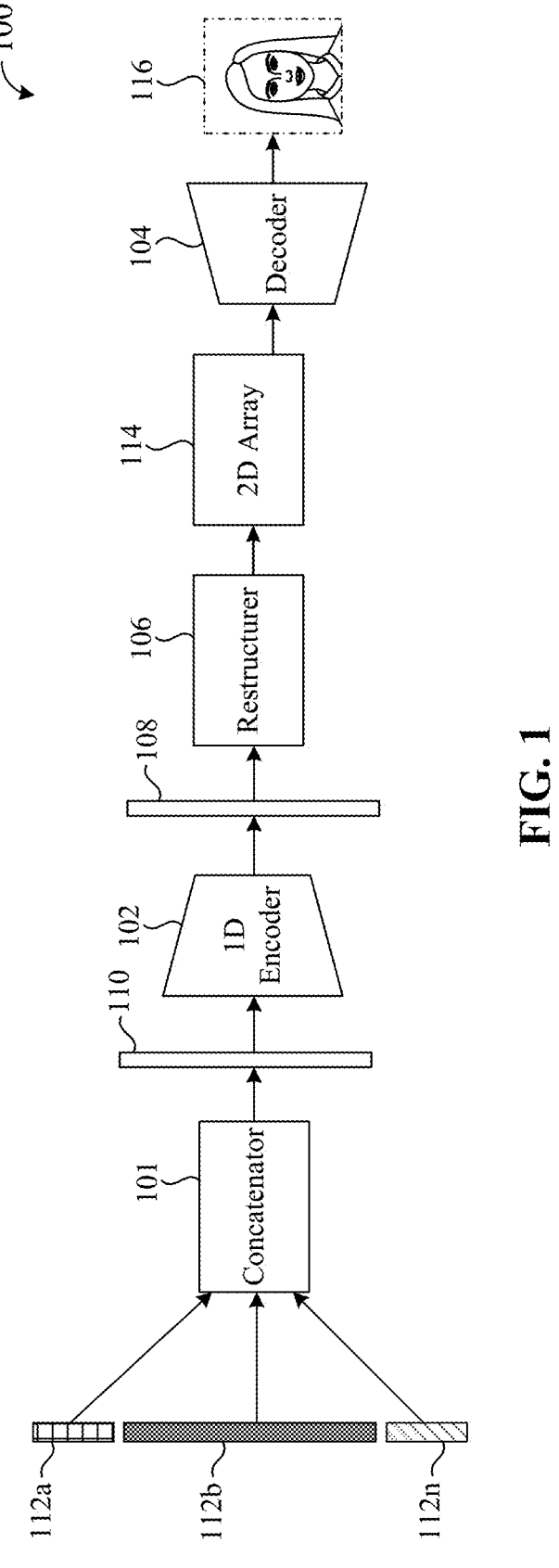
FIG. 1 illustrates an example of an architecture, executable by a data processing system, capable of generating an image using 1D inputs.

While the disclosure concludes with claims defining novel features, it is believed that the various features described herein will be better understood from consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to creating visual images, and more particularly, to generating images of virtual humans conditioned on various types of inputs. Conventional machine learning architectures typically generate a 2D image of a virtual human's face from a facial landmark image. A neural network or other machine learning architecture for generating the virtual human's face may only accept input data that is representable as a 2D image like that of the facial landmark image. User control over the generation of the virtual human, however, is enhanced by, and indeed, may require data that is not rendered as a 2D data structure. For example, rendering different facial expressions of the virtual human may best be modeled using a 1D vector input or n-tuple whose elements are blend shape coefficients.

In accordance with the inventive arrangements disclosed herein, methods, systems, and computer program products are provided for generating images using 1D inputs. One aspect of the inventive arrangements is a novel encoder-decoder architecture capable of generating a 2D image as a spatial representation whereby the 2D image is generated from one or more 1D inputs that each lack a spatial representation. Another aspect of the inventive arrangements is a novel fusion architecture capable of generating 2D images by fusing 1D vector inputs with 2D vector inputs. Within the domain of deep learning, transforming raw data (e.g., pixel values of an image) into a suitable internal representation (e.g., feature vector) is strongly related with latent spaces that provide the structure of such representations. The novel fusion architecture combines separate latent spaces of 1D and 2D encoders so that feature modalities of a 1D encoder output may be fused with the output of a 2D image encoder. The fusion architecture implements machine learning to create information-mapping connections between concatenated 2D tensors, generating fused tensors that output an image when decoded by an image decoder.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an architecture 100 that is capable of converting 1D input to 2D images. In the case of virtual humans, the input can be a 1D data structure representation of audio concatenated with one or more additional 1D data structures representing information such as head pose information (e.g., rotation and translation). By converting the 1D input information for rendering a virtual human, architecture 100 outputs a 2D image (e.g., a RGB image) of the virtual human. Architecture 100 may be implemented as a software framework that is executable by a data processing system. An example of a data processing system that is suitable for executing architecture 100 as described herein and/or for training a machine learning model included in architecture 100 is described herein in connection with FIG. 8.

In certain embodiments, architecture 100 includes 1D encoder 102 and decoder 104. 1D encoder 102 and decoder 104 can be implemented as parameterized functions and cooperatively implement, for example, a deep learning algorithm. Architecture 100 includes restructurer 106 interposed between 1D encoder 102 and decoder 104.

Operatively. 1D encoder 102 generates encoded 1D feature vector 108 by encoding concatenated 1D vector 110. Concatenated 1D vector 110 is generated by concatenator 101 and comprises a concatenation of multiple 1D vectors 112a, 112b, and 112n. Although illustratively only three 1D vectors are shown, more generally, concatenated 1D vector 110 can comprise any integer number of two or more 1D vectors. Multiple 1D vectors 112a, 112b, and 112n may each be of a different modality. Features of a 1D vector may comprise head pose information. Another 1D vector may have features comprising audio data. Features representing audio data may comprise viseme coefficients, which each represent the position of a virtual human's face and mouth when speaking a word. A viseme is the visual equivalent of a phoneme, which is the basic acoustic unit from which a word is formed.

Features of one of multiple 1D vectors 112a, 112b, or 112n may comprise blend shape coefficients. In generating an image of a virtual human, different blend shapes can be used to represent different motions of the image. For example, in generating facial features (expressions and motions) of the image, various blend shapes can be used to create eye (e.g., squinting) and/or mouth movements (speaking), the lowering or raising of the virtual human's eyebrows, and the like. A blend shape is a set of per-vertex offset vectors, usually in a localized region of a silhouette, mesh, or wireframe. Data for generating the image of the virtual human can supplement pose data by adding blend shapes—that is, offset vectors that are scaled by a weight factor—allowing the image of the virtual human to exhibit lifelike qualities (e.g., synchronized speech).

Encoded 1D feature vector 108 formed by encoding concatenated 1D vector 110 is fed into restructurer 106. Restructurer 106, in certain embodiments, is a deep learning neural network comprising multiple linear fully connected layers. During a training phase, restructurer 106 generates multiple mapping connections between features of 1D feature vector 108 and features of 2D array, in which the features are arranged spatially. Re-shape operations performed by components of restructurer 106 are capable of rearranging the features of a 1D vector into a 2D array. Restructurer 106 generates encoded 2D array 114 by rearranging the features of encoded 1D feature vector 108 into a 2D spatial arrangement. Encoded 2D array 114 thus comprises multiple features arranged in a 2D data structure, the features derived from the features of multiple 1D vectors 112a, 112b, and 112n. Given that the features of encoded 1D feature vector 108 are formed by encoding concatenated 1D vector 110, the features of 1D feature vector 108 may include, for example, head pose, audio, blend shapes, and/or other features derived from multiple 1D vectors 112a, 112b, and 112n. Encoded 2D array 114 is generated by restructurer 106 rearranging features of the encoded 1D feature vector 108 into a 2D arrangement.

Decoder 104 generates image 116 by decoding encoded 2D array 114. In certain embodiments, decoder 104 is trained using machine learning to implement a parameterized function that generates image 116 given specific values of the features spatially arranged in encoded 2D array 114. That is, image 116 is a machine learning model prediction generated by decoder, which implements a learned function that maps feature values of 2D array 114 from a 2D domain vector space to a 2D range or co-domain vector space to generate image 116. The feature values are those of encoded 1D feature vector 108, which encodes the features of concatenated 1D vector 110. Although decoder 104 renders image 116 by decoding encoded 2D array 114, the features of 2D array 114 are features of encoded 1D feature vector 108 mapped into the 2D spatial arrangement of 2D array 114. Accordingly, as decoded, image 116 is predicated on the features of encoded 1D feature vector 108. Thus, image 116 is the image of a virtual human created based on the features of multiple 1D vectors 112a, 112b, and 112n, which are concatenated into concatenated 1D vector 110 and input to 1D encoder 102 to create encoded 1D feature vector 108.

Decoder 104 implements a machine learning model (e.g., generative deep learning model) that is trained to generate images that correspond to a virtual human having a specific identity—that is, a virtual human recognizable as the same being or entity based on specific physical characteristics. For example, each image of the virtual human generated by decoder 104 has the same eyes, hair, and facial features, albeit with different facial expressions and/or mouth movements in various image renderings.

Illustratively, image 116 is the facial image of a specific virtual human. Architecture 100 may generate a video rendering of the virtual human, the video rendering comprising a sequence of images including image 116 and generated in the same manner. The video rendering, in certain embodiments, may comprise an audiovisual rendering of the virtual human that communicates verbally based on 1D audio inputs. That is, the speech of the virtual human may be based on audio features included among those of multiple 1D vectors 112a, 112b, and 112n. Depending on the specific device rendering image 116, if image 116 is rendered as part of an audiovisual rendering of the virtual human, the audio features can support rendering the virtual human speaking. Audio features can include visemes for synchronizing the lip and facial movements of the virtual human with the virtual human's speech. Facial features of the audiovisual rendering of the virtual human may be derived from blend shape coefficients input initially with one of multiple 1D vectors 112a, 112b, and 112n.

FIG. 2 illustrates an example method 200 that may be performed by a system executing architecture 100. As noted above, architecture 100 may be executed by a data processing system (e.g., computer) such as data processing system 800 described in connection with FIG. 8 or another suitable computing system. The system may generate an image based on 1D vector inputs. The image may be an image of a virtual human.

In block 202, the system generates concatenated 1D vector 110. Concatenated 1D vector 110 is generated by concatenating multiple 1D vectors 112a, 112b, and 112n. Multiple 1D vectors 112a, 112b, and 112n may include 1D vectors of at least two different modalities. One modality may be head pose information. Another modality may be audio. Features of a 1D vector representing audio may comprise viseme coefficients that represent different positions of a virtual human's face and mouth when speaking a specific word. Features of a 1D vector may comprise blend shapes.

In block 204, the system generates encoded 1D feature vector 108. Encoded 1D feature vector 108 is generated by the system encoding concatenated 1D vector 110. The features of encoded 1D feature vector 108 thus encodes the features of multiple 1D vectors 112a, 112b, and 112n whose concatenation created concatenated 1D vector 110, which is encoded by the system to generate encoded 1D feature vector 108.

In block 206, the system generates an encoded 2D array 114. 2D array 114 is a spatial arrangement of the multiple features of encoded 1D feature vector 108. 2D array 114 may be generated by a multi-layer deep learning neural network that, using machine learning, creates multiple mapping connections during the training phase. The mapping connections map the features of encoded 1D feature vector 108 into the spatial arrangement of 2D array 114. The multiple mapping connections are thus trained to generate 2D array 114 by creating a spatial arrangement of the multiple features of encoded 1D feature vector 108. As noted, the multiple features are features derived from the features of multiple 1D vectors 112a, 112b, and 112n. Thus, the spatially arranged features of 2D array 114 may include, for example, head pose, audio, blend shapes, and/or other features of multiple 1D vectors 112a, 112b, and 112n.

In block 208, the system generates an image 116. The system generates image 116 by decoding features mapped from encoded 1D feature vector 108 into the spatial arrangement of 2D array 114. The system, in certain embodiments, may decode the spatially arranged features of 2D array 114 using a decoder trained to implement a parameterized function that generates image 116 given specific values of the features. The feature values are those of encoded 1D feature vector 108, which encodes the features of concatenated 1D vector 110.

Image 116 may be the image of a virtual human. The system may generate a video rendering of the virtual human, the video rendering comprising a sequence of images including image 116 and generated in the same manner. The video rendering, in certain embodiments, may comprise an audiovisual rendering of the virtual human whose speech may be based on audio features included among those of multiple 1D vectors 112a, 112b, and 112n. Other features for rendering the virtual human may include visemes for synchronizing the lip and facial movements of the virtual human with the speech. Facial features of the audiovisual rendering of the virtual human may be derived from blend shape coefficients input initially as the features one or more of multiple 1D vectors 112a, 112b, and 112n.

Figure 3:
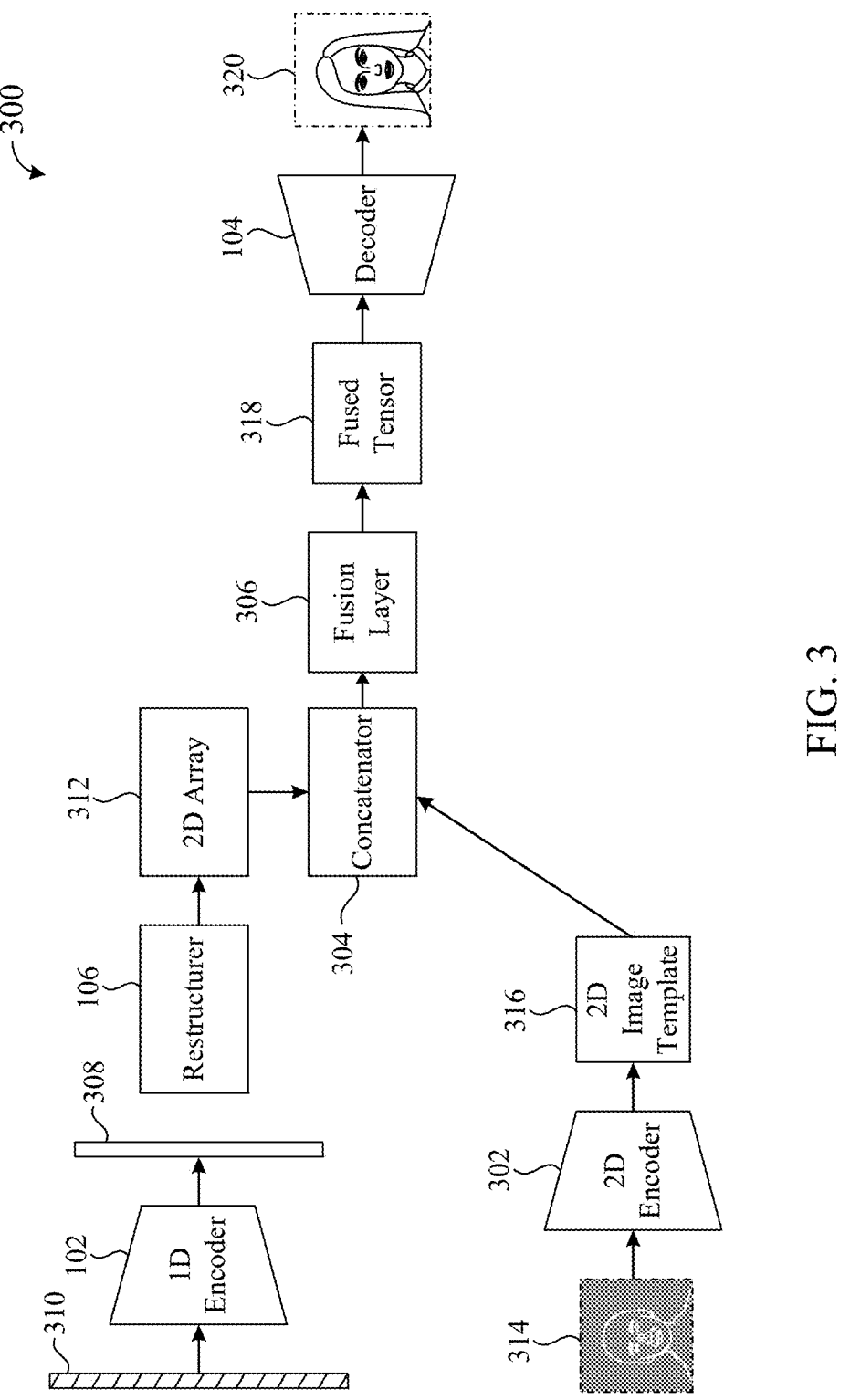
FIG. 3 illustrates another example architecture executable by a data processing system to generate images by combining 2D and 1D inputs.

FIG. 3 illustrates an example of architecture 300 that is capable of generating 2D images based partly on 1D inputs. Architecture 300 also may be implemented as a software framework that is executable by a data processing system such as data processing system 800 described herein in connection with FIG. 8.

Architecture 300 illustratively includes 1D encoder 102, decoder 104, and restructurer 106. Additionally, architecture 300 includes 2D encoder 302, which in certain embodiments may operate in parallel with 1D encoder 102. Architecture 300 also includes concatenator 304 and fusion layer 306. Concatenator 304 and fusion layer are part of a pipeline extending from 1D and 2D encoders 102 and 302 to decoder 104.

Operatively, 1D encoder 102 generates encoded 1D feature vector 308 by encoding concatenation 310 of multiple 1D feature vectors. Features of 1D feature vector 308 are rearranged into a spatial arrangement by restructurer 106 to generate 2D array 312, whose features correspond to those of concatenation 310, albeit encoded and restructured into a spatial arrangement.

2D encoder 302 encodes 2D contour, or wireframe, 314. 2D contour 314 represents facial and head motions, such as eyebrows raising, eyes blinking, head rotation, and the like. 1D feature vector 308 conveys other information, such as audio and lighting. For example, synchronized lip movements are generated with information encoded in 1D feature vector 308, encoded from concatenation 310, while facial and head motions are synthesized from 2D contour 314.

Encoded 2D image template 316 is generated by 2D encoder 302 encoding 2D contour 314. Concatenator 304 concatenates encoded 2D image template 316 with 2D array 312 restructured from encoded 1D feature vector 308. Concatenation of encoded 2D image template 316 with 2D array 312 creates a concatenated tensor. Encoded 2D image template 316, concatenated with 2D array 312, is fed into fusion layer 306. Fusion layer 306 generates fused tensor 318 by fusing encoded 2D image template 316 with encoded 2D array 312. During a training phase using machine learning, fusion layer 306 creates multiple mapping connections. Fusion layer 306 may comprise multiple residual blocks that generate fused tensor 318 using the mapping connections. In some arrangements, for example, 2D image template 316 and 2D array 312 are 16×16 arrays, which when concatenated along the channel dimension form a 2×16×16 tensor. Fusion layer 306 maps the 2×16×16 tensor to fused tensor 318, whose fused features, for example, form a 4×8×8 tensor.

Decoder 104 generates image 320 by decoding fused tensor 318. Image 320 is an image of a virtual human. Architecture 300 is capable of generating a video rendering of the virtual human, the video rendering comprising a sequence of images including image 320 of the virtual human and generated in the same manner. The video rendering, in certain embodiments, may comprise an audiovisual rendering of the virtual human that communicates verbally. Image 320 is generated by architecture 300's synthesizing inputs having different modalities, the image being a photorealistic image of a human. Architecture 300 utilizes two encoders for encoding input data having different modalities. Decoder 104 is trained using machine learning to convert the features encoded by the different encoders into image 320. Image 320, depending on the inputs, can be an RGB image.

Architecture 300 thus combines 1D and 2D inputs having different modalities to generate an image. The combining of 1D and 2D inputs provides architecture 300 with unique capabilities in generating images, especially with respect to generating images of virtual humans. One of the unique capabilities is the capability to train decoder 104 based on attributes of one particular virtual human and to subsequently generate one or more different virtual humans using different static template images. A static template image is distinct from a contour or wireframe. A contour conveys dynamic information such facial and head movements. A static template image conveys static image information of features such as shapes of the eyes and nose, hair coloring, skin tone, clothing texture, and the like.

Conventional machine learning techniques train a model to generate virtual humans, but the model only generates a virtual human whose identity corresponds to the specific example, that is, the contour, or wireframe, used to train the model. The model only learns to generate a single virtual human and is stored in the decoder. Generating two or more different virtual humans requires that the conventional machine learning techniques require training two or more models using different examples to generate the images of different virtual humans.

By contrast architecture 300 does not learn and store specific identifying characteristics, such as facial features, shapes of the eyes and nose, color of the eyes and hair, or other identifying characteristics of the target. Rather, the characteristics are derived from one input, namely the static template image. The static template image provides static information. A 1D feature vector (e.g., encoded 1D feature vector 108) provides information (e.g., time-series data) for movement and/or speech of the image whose static features are provided by the 2D static template image. Architecture 300 is able to generate any number of virtual humans merely by changing one static template image for another. The static template image is the 2D input that couples with the 1D input to generate a unique virtual human for each different static template image provided.

Figure 4:
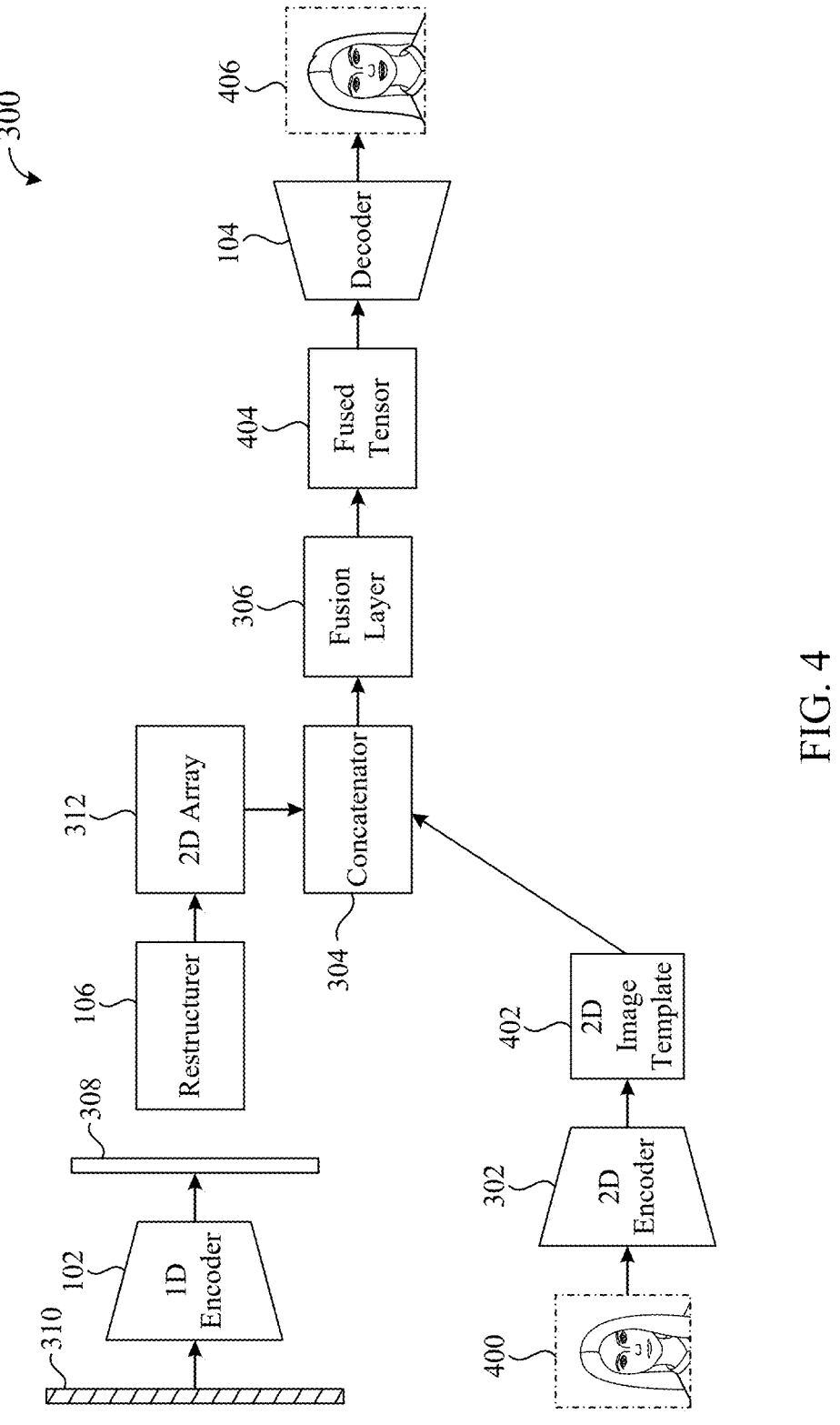
FIG. 4 illustrates certain operative aspects of the architecture of FIG. 3.

FIG. 4 illustrates this aspect of architecture 300 utilizing combinations of 1D and 2D inputs of different modalities. Encoded 1D feature vector 308 is generated by 1D encoder 102 encoding concatenation 310. 2D array 312 is generated by restructurer 106 spatial rearranging the features of encoded 1D feature vector 308. In FIG. 4, static template image 400 replaces others used in training of 2D encoder 302 or in generating a different target image of a different virtual human. 2D encoder 302 generates 2D image template 402 from newly input static template image 400. Concatenator 304 concatenates 2D image template 402 with 2D array 312 and feeds the concatenation into fusion layer 306. Fusion layer 306 generates fused tensor 404. Decoder 104 decodes fused tensor 404, generating image 406. Image 406 is the image of a virtual human. The identity of the virtual human is changed from others generated by decoder 104, the change in response to the encoding of static template image 400, which is different than that of other virtual humans generated by decoder 104. Decoder 104, as a machine learning model, is trained based on data corresponding to one virtual human. Once trained, however, though operative features of decoder 104 do not change, the virtual humans generated by decoder 104 change according to different data input with each static template image corresponding to different virtual humans.

Input of a 1D vector changes the facial expression of the virtual human in image 406. The facial expression of static template image 400 is changed to a smile in image 406.

FIG. 5 illustrates an example method 500 that may be performed by a system executing architecture 300 in performing the operative aspects illustrated in FIG. 4. As noted above, architecture 300 may be executed by a data processing system such as data processing system 800 described in connection with FIG. 8 or another suitable computing system. The system may generate an image based on 1D vector inputs. The image may be an image of a virtual human, which is changeable to a different virtual human in response to encoding a different 2D static template image.

In block 502, the system generates encoded 2D image template 402 by encoding 2D static template image 400. Static template image 400 uniquely corresponds to a virtual human having an identity determined by specific facial characteristics and other observable features that give the virtual human a lifelike quality.

In block 504, the system generates encoded 1D feature vector 308. Encoded 1D feature vector 308 is generated by the system encoding concatenation 310 of a plurality of 1D vectors. The 1D vectors can have distinct modalities. In certain embodiments each of the 1D vectors comprises multiple features corresponding to different modalities. In certain embodiments each of the 1D vectors comprises multiple features corresponding to different modalities. Certain of the 1D vectors include features for changing the direction of illumination of the face of the virtual human.

The 1D vectors may include a 1D vector whose features include head pose information. Alternatively, or additionally, the 1D vectors may include a 1D vector whose features comprise blend shape coefficients. The 1D vectors may include a 1D vector comprising multiple features representing audio data. The multiple features representing audio data may include a plurality of viseme coefficients.

In block 506, the system generates encoded 2D array 312. 2D array 312 comprises features derived from the features of 1D vectors forming concatenation 310. The system generates 2D array 312 by rearranging the arrangement of the multiple features of encoded 1D feature vector 308, the rearranging creating a 2D spatial representation.

In block 508, the system concatenates encoded 2D image template 402 and encoded 2D array 312. Encoded 2D image template 402, concatenated with 2D array 312, is input to fusion layer 306.

In block 510, the system generates fused tensor 404. Fused tensor 404 is generated by fusing encoded 2D image template 402 with encoded 2D array 312.

In block 512, the system generates image 406. Image 406 is an image of a virtual human. Image 406 is generated by the system decoding the fused tensor. Image 406 of the virtual human is changeable to a different virtual human in response to encoding a different 2D static template image in place of static template image 400.

Method 500, in certain embodiments, includes the system generating a video rendering of the virtual human. The video rendering includes multiple images generated by the system in the manner described in generating image 406 of the virtual human. At least one visual characteristic of image 406 of the virtual human can be changed in response encoding a different concatenation of 1D vectors than that of concatenation 310. A different concatenation is created by changing one or more of the 1D vectors making up concatenation 310. In some embodiments, changing at least one visual characteristic includes changing the direction of illumination of the image of the virtual human.

In certain embodiments, method 500 includes the system concatenating encoded 2D image template 402 and encoded 2D array 312 along a channel dimension.

There are other unique capabilities of architecture 300, these arising from the combining of 1D and 2D inputs having different modalities. Another of the unique capabilities of architecture 300 in generating images is generating the images conditioned on both 1D and 2D data. The conditioning enables architecture 300 to change at least one visual characteristic of an image that architecture 300 generates, the change induced by changing the concatenation of 1D vectors input to architecture 300. Changeable visual characteristics include illumination, facial expressions, and the like. A change, for example, is a change in the direction of light illuminating the image of the virtual human. The 2D data input may induce architecture 300 to generate an image in which the left side of the virtual human's face is illuminated. Combining the 2D data input with a specific 1D data input in which the 1D data input changes the image so that the right side of the virtual human's face is illuminated. Using machine learning, architecture 300 is trained to change the illumination of each different image generated by combining the specific 1D data input with a 2D data input.

Figure 6:
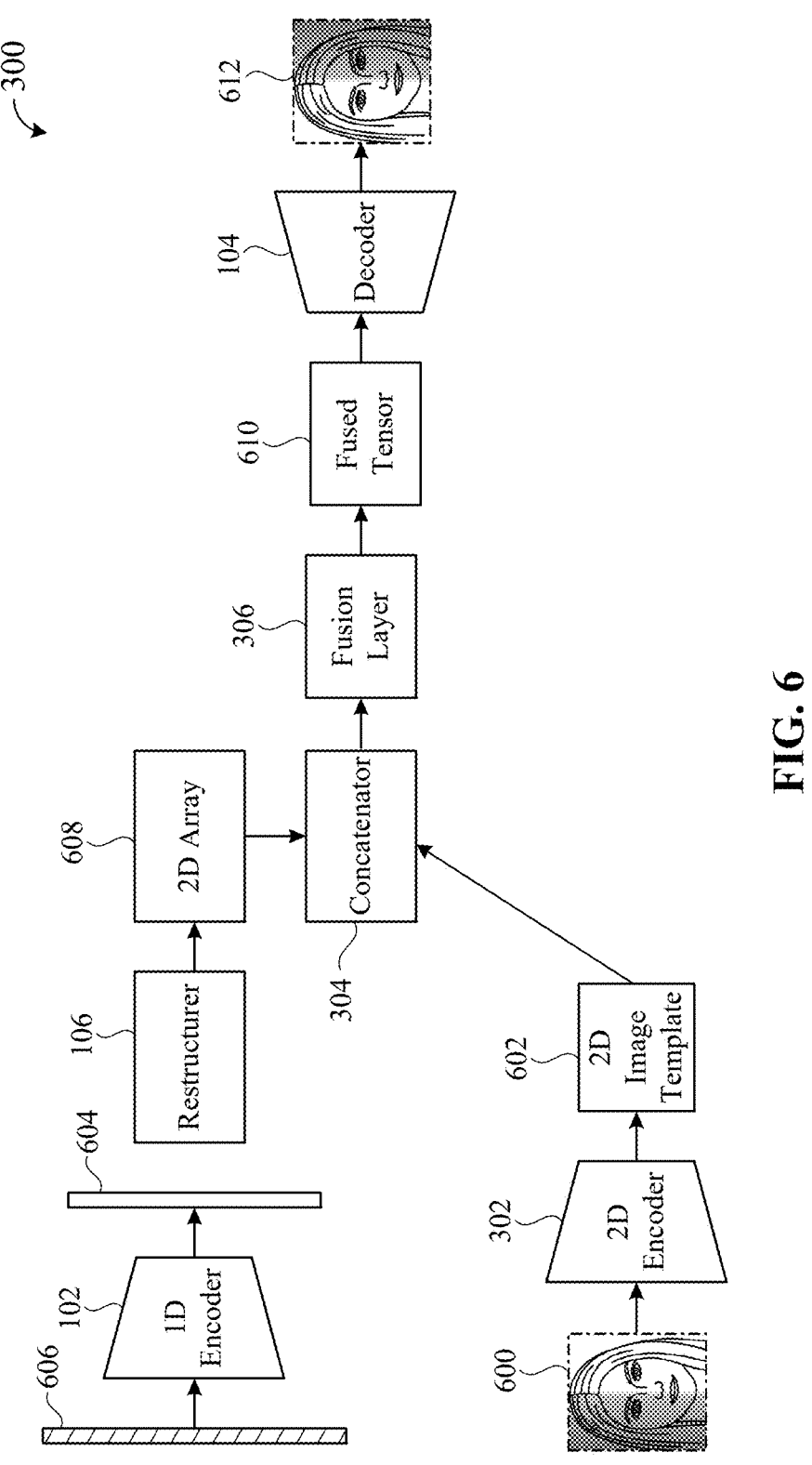
FIG. 6 illustrates certain other operative aspects of the architecture of FIG. 3.

FIG. 6 illustrates this aspect of architecture 300 utilizing combinations of 1D and 2D inputs of different modalities. In FIG. 6, static template image 600 is fed to 2D encoder 302, static template image 600 providing a static template image in which light falls upon the left side of the face of a virtual human. 2D encoder 302 generates 2D image template 602 from newly input static template image 600. 1D encoder 102 generates encoded 1D feature vector 604 by encoding concatenation 606. Concatenation 606 includes one or more specific 1D vectors whose features change the direction of illumination of the face of the virtual human, for example, from illuminating the left side of the face to illuminating the right side of the face.

2D array 608 is generated by restructurer 106 spatial rearranging the features of encoded 1D feature vector 604 in a 2D spatial arrangement. Concatenator 304 concatenates 2D image template 602 with 2D array 608 and feeds the concatenation into fusion layer 306. Fusion layer 306 generates fused tensor 610. Decoder 104 decodes fused tensor 610, generating image 612. Image 612 is the image of the virtual human corresponding to static template image 600. The illumination of the face of the virtual human of image 612, however, is changed. In image 612, light falls upon the right side of the face of the virtual human in response to inclusion in concatenation 606 the one or more 1D vectors whose features change the direction of illumination of the face of the virtual human.

The direction of illumination for static template image 600 is fixed. During a training phase, however, architecture 300 is trained using data that includes information of different directions of illumination of the face in corresponding images. Architecture 300 through machine learning creates a mapping function between static template image 600 and concatenation 606 for generating image 612. As trained, architecture 300 is capable at inference time of outputting image 612 in which the direction of illumination is changed in accordance with the particular data of concatenation 606, which dictates the direction of illumination for the image. Other visual characteristics of image 612 of the virtual human can be changed in response to encoding a different concatenation of 1D vectors.

FIG. 7 illustrates an example method 700 that may be performed by a system executing architecture 300 in performing the operative aspects illustrated in FIG. 6. Method 700 changes one or more visual characteristics of an image in response to the encoding of a specific concatenation of 1D vectors.

In block 702, the system generates encoded 2D image template 602 by encoding 2D static template image 600. Static template image 600 corresponds to the image of a virtual human. The left side of the virtual human's face is illuminated.

In block 704, the system generates encoded 1D feature vector 604. Encoded 1D feature vector 604 is generated by the system encoding a concatenation 606 of a plurality of 1D vectors. The 1D vectors can have distinct modalities. In certain embodiments each of the 1D vectors comprises multiple features corresponding to different modalities. Certain of the 1D vectors include features for changing the direction of illumination of the face of the virtual human.

In block 706, the system generates encoded 2D array 608. 2D array 608 comprises features derived from the features of 1D vectors forming concatenation 606, including those for changing the direction of illumination of the face of the virtual human. The system generates 2D array 608 by reconfiguring an arrangement of the multiple features of encoded 1D feature vector 604.

In block 708, the system concatenates encoded 2D image template 602 and encoded 2D array 608. Encoded 2D image template 602, concatenated with 2D array 608, is input to fusion layer 306.

In block 710, the system generates fused tensor 610. Fused tensor 610 is generated by fusing encoded 2D image template 602 with encoded 2D array 608.

In block 712, the system generates image 406. Image 406 is an image of a virtual human. Image 406 is generated by the system decoding the fused tensor. At least one visual characteristic of the image of the virtual human is changeable in response to encoding a different concatenation of 1D vectors. The system may generate a video rendering of the virtual human, the video rendering including the image of the virtual human as well as multiple other images of the virtual human. The video rendering may show the changing visual characteristics of the virtual human in the video rendering of multiple images.

Figure 8:
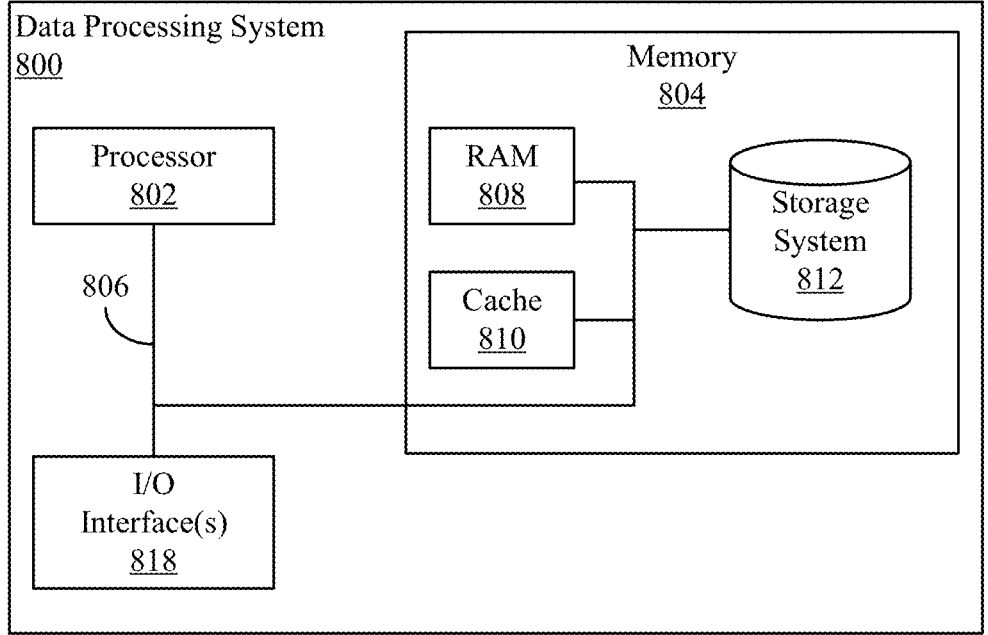
FIG. 8 illustrates an example implementation of a data processing system capable of executing the architectures described within this disclosure.

FIG. 8 illustrates an example implementation of a data processing system 800. As defined herein, the term "data processing system" means one or more hardware systems configured to process data, each hardware system including at least one processor and memory, wherein the processor is programmed with computer-readable instructions that, upon execution, initiate operations. Data processing system 800 can include a processor 802, a memory 804, and a bus 806 that couples various system components including memory 804 to processor 802.

Processor 802 may be implemented as one or more processors. In an example, processor 802 is implemented as a central processing unit (CPU). Processor 802 may be implemented as one or more circuits capable of carrying out instructions contained in program code. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having a 10×6 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. The computer-readable program instructions may implement any of the different examples of architecture 100 and/or 300 as described herein. Processor 802, in executing the computer-readable program instructions, is capable of performing the various operations described herein that are attributable to a computer. It should be appreciated that data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Examples of data structures include images and meshes.

Data processing system 800 may include one or more Input/Output (I/O) interfaces 818 communicatively linked to bus 806. I/O interface(s) 818 allow data processing system 800 to communicate with one or more external devices and/or communicate over one or more networks such as a local area network (LAN), a wide area network (WAN), and/or a public network (e.g., the Internet). Examples of I/O interface(s) 818 may include, but are not limited to, network cards, modems, network adapters, hardware controllers, etc. Examples of external devices also may include devices that allow a user to interact with data processing system 800 (e.g., a display, a keyboard, a microphone for receiving or capturing audio data, speakers, and/or a pointing device).

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C." "at least one of A, B. or C." "one or more of A, B, and C." "one or more of A, B, or C." and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments." and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if." "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, comprising:
concatenating a plurality of 1D vectors forming a concatenated 1D vector, wherein the plurality of 1D vectors include 1D vectors of at least two different modalities;
generating an encoded 1D feature vector by encoding the concatenated 1D vector;
generating an encoded 2D array of features by reshaping an arrangement of features of the encoded 1D feature vector; and
generating an image of a virtual human by decoding the encoded 2D array.

2. The computer-implemented method of claim 1, further comprising:
generating a video rendering of the virtual human, wherein the video rendering includes the image of the virtual human.

3. The computer-implemented method of claim 1, wherein each 1D vector of the plurality of 1D vectors is of a different modality.

4. The computer-implemented method of claim 1, wherein the plurality of 1D vectors includes a 1D vector having a first modality including head pose information.

5. The computer-implemented method of claim 1, wherein the plurality of 1D vectors includes a 1D vector having a second modality including features representing audio data.

6. The computer-implemented method of claim 5, wherein the features representing audio data includes a plurality of viseme coefficients.

7. The computer-implemented method of claim 1, wherein the plurality of 1D vectors includes a 1D vector with features comprising blend shape coefficients.

8. A computer-implemented method, comprising:

generating an encoded 2D image template by encoding a 2D static template image;

generating an encoded 1D feature vector by encoding a concatenation of a plurality of 1D vectors;

generating an encoded 2D array of features by reshaping an arrangement of multiple features of the encoded 1D feature vector;

concatenating the encoded 2D image template and the encoded 2D array of features;

generating a fused tensor by fusing the encoded 2D image template with the encoded 2D array of features; and generating an image of a virtual human by decoding the fused tensor, wherein the image of the virtual human is changeable to a different virtual human in response to encoding a different 2D static template image.

9. The computer-implemented method of claim 8, further comprising:

generating a video rendering of the virtual human, wherein the video rendering includes the image of the virtual human.

10. The computer-implemented method of claim 8, further comprising:

changing at least one visual characteristic of the image of the virtual human in response to encoding a different concatenation of 1D vectors.

11. The computer-implemented method of claim 10, wherein the changing at least one visual characteristic includes changing a direction of illumination of the image of the virtual human.

12. The computer-implemented method of claim 8, wherein the concatenating concatenates the encoded 2D image template and the encoded 2D array of features along a channel dimension.

13. The computer-implemented method of claim 8, wherein the generating the encoded 1D feature vector includes encoding a concatenation of a plurality of 1D vectors that each comprise multiple features corresponding to different modalities.

14. The computer-implemented method of claim 8, wherein the plurality of 1D vectors includes a 1D vector whose features include head pose information.

15. The computer-implemented method of claim 8, wherein the plurality of 1D vectors includes a 1D vector whose features comprise blend shape coefficients.

16. The computer-implemented method of claim 8, wherein the plurality of 1D vectors includes a 1D vector comprising a plurality of features representing audio data.

17. The computer-implemented method of claim 16, wherein the plurality of features representing audio data includes a plurality of viseme coefficients.

18. A computer-implemented method, comprising:

generating an encoded 2D image template by encoding a 2D static template image;

generating an encoded 1D feature vector by encoding a concatenation of a plurality of 1D vectors;

generating an encoded 2D array of features by reshaping an arrangement of multiple features of the encoded 1D feature vector;

concatenating the encoded 2D image template and the encoded 2D array of features;

generating a fused tensor by fusing the encoded 2D image template with the encoded 2D array of features; and generating an image of a virtual human by decoding the fused tensor, wherein at least one visual characteristic of the image of the virtual human is changeable in response to encoding a different concatenation of 1D vectors.

19. The computer-implemented method of claim 18, further comprising:

generating a video rendering of the virtual human, wherein the video rendering includes the image of the virtual human.

20. The computer-implemented method of claim 18, wherein the generating the encoded 1D feature vector includes encoding a concatenation of a plurality of 1D vectors that each comprise multiple features corresponding to different modalities.

\* \* \* \* \*